United States Patent [19]

Fox et al.

[11] Patent Number: 5,063,729
[45] Date of Patent: Nov. 12, 1991

[54] COTTON HARVESTER BLOCKAGE DETECTION METHOD AND FLOW SENSOR THEREFOR

[75] Inventors: Robert E. Fox, Minburn; James J. Phelan, Bettendorf, both of Iowa

[73] Assignee: Deere & Company, Moline, Ill.

[21] Appl. No.: 584,675

[22] Filed: Sep. 19, 1990

[51] Int. Cl.$^5$ .............................................. A01D 46/10
[52] U.S. Cl. ........................................ 56/30; 56/10.2; 56/DIG. 15
[58] Field of Search .................. 56/28, 30, 36, 41, 50, 56/10.2, DIG. 15

[56] References Cited

U.S. PATENT DOCUMENTS

| | | | |
|---|---|---|---|
| 3,863,428 | 2/1975 | Baxter | 56/10.2 |
| 4,068,223 | 1/1978 | Steffen | 56/10.2 |
| 4,286,424 | 9/1981 | Hubbard | 56/10.2 |
| 4,414,792 | 11/1983 | Bettencourt et al. | 56/10.2 |
| 4,573,124 | 2/1986 | Seiferling | 364/424 |
| 4,635,047 | 1/1987 | Fox et al. | 56/10.2 |
| 4,728,954 | 3/1988 | Phelan et al. | 342/115 |
| 4,961,304 | 10/1990 | Ovsborn et al. | 56/10.2 |

FOREIGN PATENT DOCUMENTS

45626/85 7/1985 Australia .

Primary Examiner—Terry L. Melius

[57] ABSTRACT

A cotton path blockage detector has an acoustic output directed toward the discharge door floor on the cotton picking unit directly behind and to one side of the stream of cotton coming off a doffer. When the unit is operating properly, the floor area is generally clear of cotton and a first distance signal is provided. When a blockage occurs, the area begins to fill with cotton and debris, causing a decrease in the monitored distance. A threshold distance signal which is less than the distance signal to the floor causes an alarm to be activated to warn the operator of a plug. To prevent false alarms where the blockage may only be temporary, a slew rate limitation is built into the processing circuit.

In another aspect of the invention, the signal radiated into the cotton conveying path is reflected by cotton, and a doppler circuit detects the presence of a doppler shift in frequency indicating moving cotton in the path. Absence of the doppler shaft indicates either the unit is off or the unit is plugged upstream of the detector. Detection of cotton in the path with a corresponding doppler frequency shift indicates acceptable operation, while detection of cotton with no frequency shift indicates a downstream plug.

24 Claims, 3 Drawing Sheets

COTTON HARVESTER BLOCKAGE DETECTION METHOD AND FLOW SENSOR THEREFOR

BACKGROUND OF THE INVENTION

1) Field of the Invention

The present invention relates generally to cotton harvesters and, more specifically, to flow sensors for detecting blockages in the cotton conveying system of a cotton harvester.

2) Related Art

A typical cotton harvester includes a pair of upright spindle drums which remove cotton from the plants and upright doffer assemblies which doff the cotton from the spindles and direct it through discharge openings into upright discharge structure on the cotton harvester row unit. The cotton is removed from the discharge structure by cotton conveying ducts which carry air jet nozzles to propel the cotton into the basket on the harvester. Cotton and debris can often build up in an area of the cotton conveying system, and it is necessary to detect such a blockage early to avoid crop loss and harvester damage. Once started, a blockage in the area can build up to completely cut off the cotton path within a few seconds. The blockage will cause cotton to wrap around the drum, and a very time consuming row unit cleanout procedure is required before harvesting can continue.

The blockage problem is particularly acute in narrow row cotton harvesters having relatively limited space for the conveying path. For example, in cotton pickers with tandem drum units such as shown in U.S. Pat. No. 4,821,497, a narrow area behind the forward drum is one of the areas most likely to plug.

Various types of detecting systems have been used in the past, including some with air pressure switches such as shown in U.S. Pat. Nos. 3,863,428 and 4,286,424. However, in certain situations such as where the plugging occurs near the discharge structure ahead of the pressure switch, the switch will not function to provide the necessary warning signal to the operator. Therefore, systems with pressure sensors often let certain types of blockages go undetected. Photoelectric cell systems are also available, but the cells are subject to being rendered inoperative by dirt and staining from the cotton material. Therefore, these systems require a high degree of maintenance. Thermistors and thermocouples to sense air flow in a duct, such as shown in U.S. Pat. No. 4,068,223, are available but are also quite sensitive and require relatively complex circuitry which must be carefully calibrated.

BRIEF SUMMARY OF THE INVENTION

It is therefore an object of the present invention to provide an improved method for sensing cotton flow within a cotton conveying system and for providing apparatus for implementing such a method. It is still another object to provide such a method and apparatus which overcome the aforementioned problems.

It is another object of the present invention to provide an improved method and apparatus for detecting blockages in a cotton conveying system. It is yet a further object of the invention to provide such a method and apparatus which can detect a blockage in the discharge area adjacent the doffers in a cotton harvester row unit. It is a further object to provide such a method and apparatus which does not depend on air pressure or air velocity to detect a blockage. It is a further object to provide such a method and apparatus which permit the sensor to be located out of the cotton flow so that the sensor is less subject to being fouled by dirt and plant debris.

It is still a further object of the present invention to provide an improved method and apparatus for detecting a blockage in the cotton conveying system on a cotton harvester which utilize a transmitter and receiver located outside of the cotton path to detect a blockage in the cotton path. It is a further object to provide such a method and apparatus which provide a distance indication to detect a buildup. It is yet a further object to provide such a method and apparatus which detect the presence of cotton and other material in an area adjacent the cotton conveying path which normally is free from buildup.

It is still a further object of the present invention to provide an improved method and apparatus for detecting blockages in a cotton conveying system of a cotton harvester which are less subject to false alarms and which can provide a more accurate indication of blockages both upstream and downstream of a detector than at least most previously available monitoring systems. It is yet another object to provide such a method and apparatus which can distinguish between temporary blockages which will clear themselves and more permanent blockages which will cause cotton loss and/or machine damage if not cleared.

It is still a further object of the present invention to provide an improved method and apparatus for detecting blockages in a cotton conveying system of a cotton harvester which utilizes an acoustic signal. It is a further object to provide such a method and apparatus which is able to distinguish between moving and stationary cotton and which can more reliably provide accurate blockage indications with fewer false alarms and unnecessary stoppages.

In accordance with the above objects, an ultrasonic sensor is provided in the row unit above the cotton conveying path. The sensor has an output directed toward the floor of the discharge door on the cotton picking unit directly behind and to the right of the stream of cotton coming off a doffer and monitors the distance to the floor of the door unit. When the unit is operating properly, the floor area is generally clear of cotton, but when a blockage occurs, the area begins to fill with cotton and debris. As the cotton builds up under the ultrasonic sensor causing the distance that is being detected by the sensor to decrease, a threshold distance signal which is less than the distance signal to the floor, causes an alarm to be activated to warn the operator of a plug. To prevent false alarms where the blockage may only be temporary, a slew rate limitation is built into the processing circuit. The sensor does not depend on air pressure or velocity changes to detect a plug, and therefore it can be located out of the cotton flow so that it is less subject to fouling by dirt and debris. By directing the signal emitted from the sensor toward a flat area normally free of cotton and debris, a strong distance reference signal is provided. The flat area lies in a plane perpendicular to the signal path.

In another aspect of the invention, the signal radiated into the cotton conveying path is reflected by cotton, and a doppler detector in the processing circuit detects the presence of moving cotton in the path. Absence of cotton indicates either the unit is off or the unit is plugged upstream of the detector. Detection of cotton in the path with a corresponding doppler frequency shift indicates acceptable operation, while detection of cotton with no frequency shift indicates a downstream plug. Therefore, reflected signals can be used to determine if the blockage originates upstream or downstream of the sensor. A more accurate alarm indication and more detailed information as to the location and degree of blockage is provided to the operator.

These and other objects, features and advantages of the present invention will become apparent to one skilled in the art upon reading the following detailed description in view of the drawings.

DETAILED DESCRIPTION OF THE DRAWINGS

Figure 1:
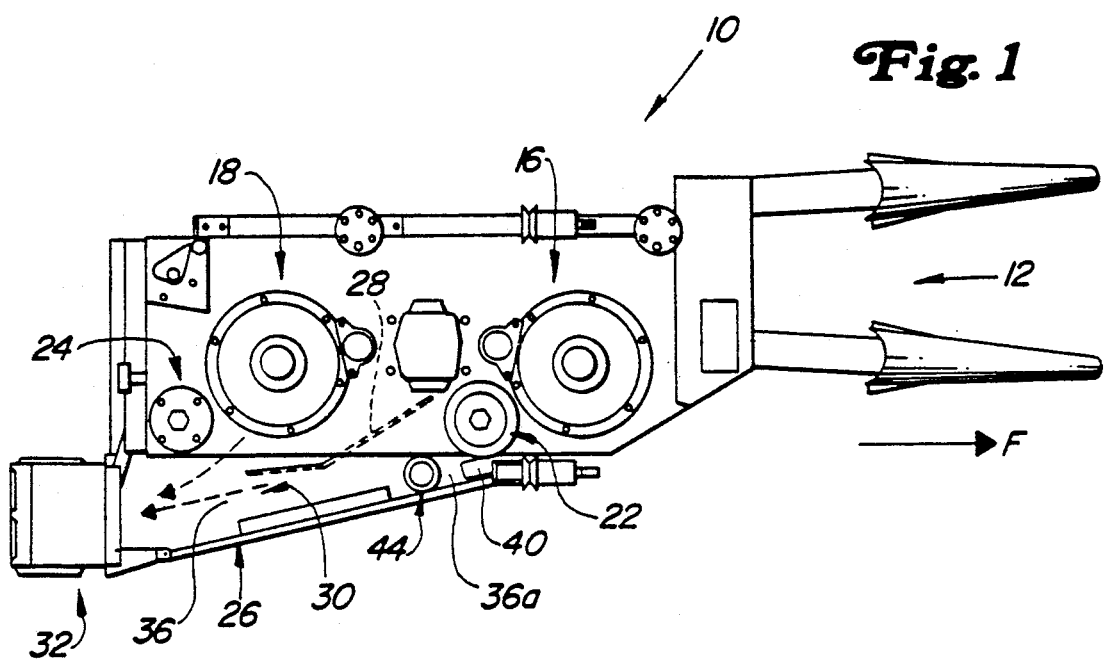
FIG. 1 is a top view of a portion of a cotton harvester row unit with a flow sensor connected thereto.

Referring now to FIG. 1, therein is shown a cotton harvester row unit 10 generally of the type described in the aforementioned U.S. Pat. No. 4,821,497. The row unit 10 includes a row receiving area 12 for receiving cotton plants therein, with a pair of upright picker drums 16 and 18 offset to one side of the row receiving area 12 for picking cotton from the plants. As shown in FIG. 1, a pair of corresponding doffers 22 and 24 are offset to the right and slightly rearwardly of the drums 16 and 18 for doffing cotton from the spindles and directing it rearwardly and outwardly into row unit door structure 26 generally in the direction of the arrows as shown in FIG. 1. An upright panel 28 closely adjacent the doffer 22 directs cotton doffed from the forward drum outwardly around the rearward drum 18.

The door structure 26 defines a portion of a cotton conveying path indicated generally at 30 which extends rearwardly and outwardly from the drums 16 and 18 to rear door structure 32. The path 30 extends upwardly through the rear door structure 32 to conventional rearwardly and upwardly directed cotton conveying ducts (not shown) having air nozzles for introducing jets of air in the downstream direction to suck the cotton from the path 30 and the structure 32. For further details of the row unit and duct structure, reference may be had to U.S. Pat. Nos. 4,821,497 and 4,875,330 which are of common ownership with the present application.

The side door structure 26 includes a floor indicated at 36 which generally defines the lower boundary of the cotton path 30 adjacent the drums 16 and 18. The floor 36 includes a portion indicated at 36a which is offset slightly from the normal flow of cotton coming off the forward doffer 22. Therefore, when cotton is flowing normally in the path 30, the area 36a is generally clear of cotton and debris. The area 36a also is located rearwardly of a nozzle 40 which provides a jet of air over the floor 36 to help move cotton rearwardly toward a discharge opening forward of the rear door structure 32 and keep the area 36a clear. However, if a blockage should occur anywhere in the cotton conveying path 30, cotton and cotton debris will start building up in the offset portion 36a. The area 36a is adjacent a narrow portion of the path that carries cotton in a zone along the side of the panel 28 that is subject to blockages.

Figure 2:
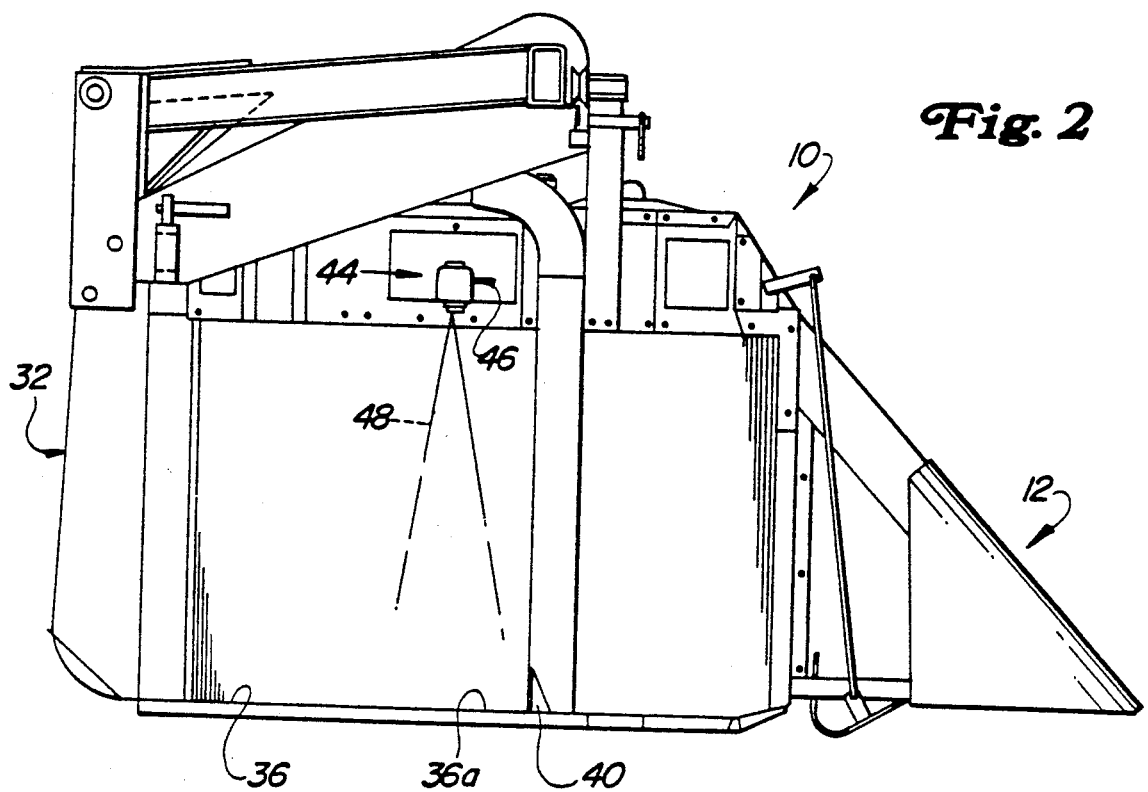
FIG. 2 is a side view of the row unit of FIG. 1 showing the location of the sensor for radiating a signal adjacent the cotton flow path.
Figure 3:
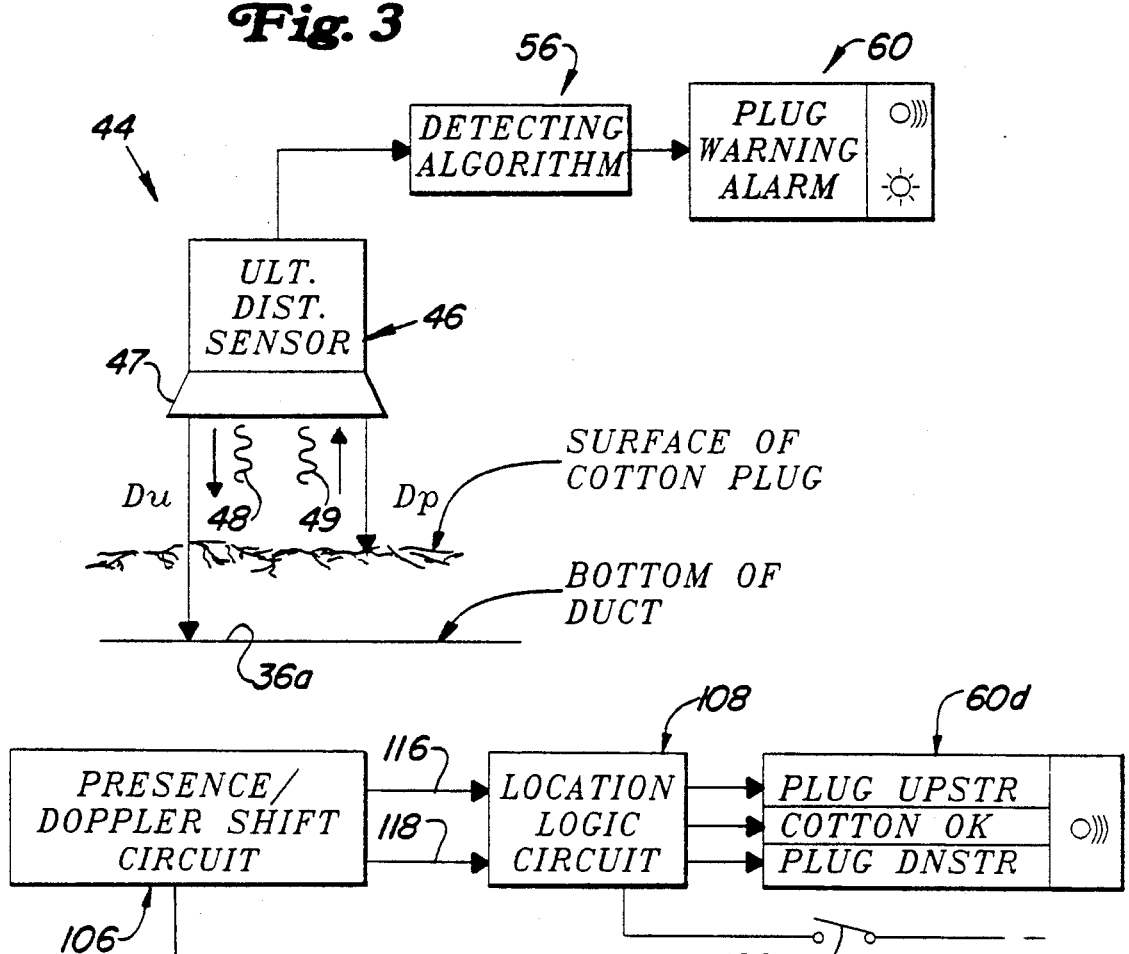
FIG. 3 is a block diagram of the sensor and detecting circuitry.

A blockage detection system 44 (FIGS. 1-3) includes a sensor or detector 46 connected to the row unit 10 at a location offset above the cotton conveying path 30 (FIG. 2). The sensor 46 includes an ultrasonic transducer 47, such as an electrostatic ultrasonic transducer part No. 607281 manufactured by Polaroid Corporation. The transducer 47 directs an ultrasonic signal 48 towards the area 36a. The area 36a or any objects between the area and the sensor 46 reflect the signal (49 of FIG. 3) back to the transducer 47 with a time delay dependent upon the relative distance between the reflecting object and the transducer. Signal processing circuitry 56 connected to the sensor 46 receives distance signals (DIST) indicative of the unblocked distance $D_u$ between the transmitter 50 and the offset portion 36a when no material is present in the offset portion. When a blockage occurs and material begins building up in the portion 36a, distance signals are provided to the signal processing circuitry 56 indicative of the shortened plugged distance $D_P$ that the signal has to travel between the transmitter and the material. If the area 36a accumulates a preselected buildup of material (preferably $D_P$ is about equal to $\frac{2}{3} D_u$ indicating a build-up of about one-third the height of the path) for a period of time determined by slew rate limiting logic (see 58 of FIG. 4), an alarm 60 located in the harvester cab is activated to alert the operator to the blockage condition. The slew rate limiting logic reduces the sensitivity of the sensor 46 to spurious reflections as material temporarily moves in the path of the beam 48.

Figure 4:
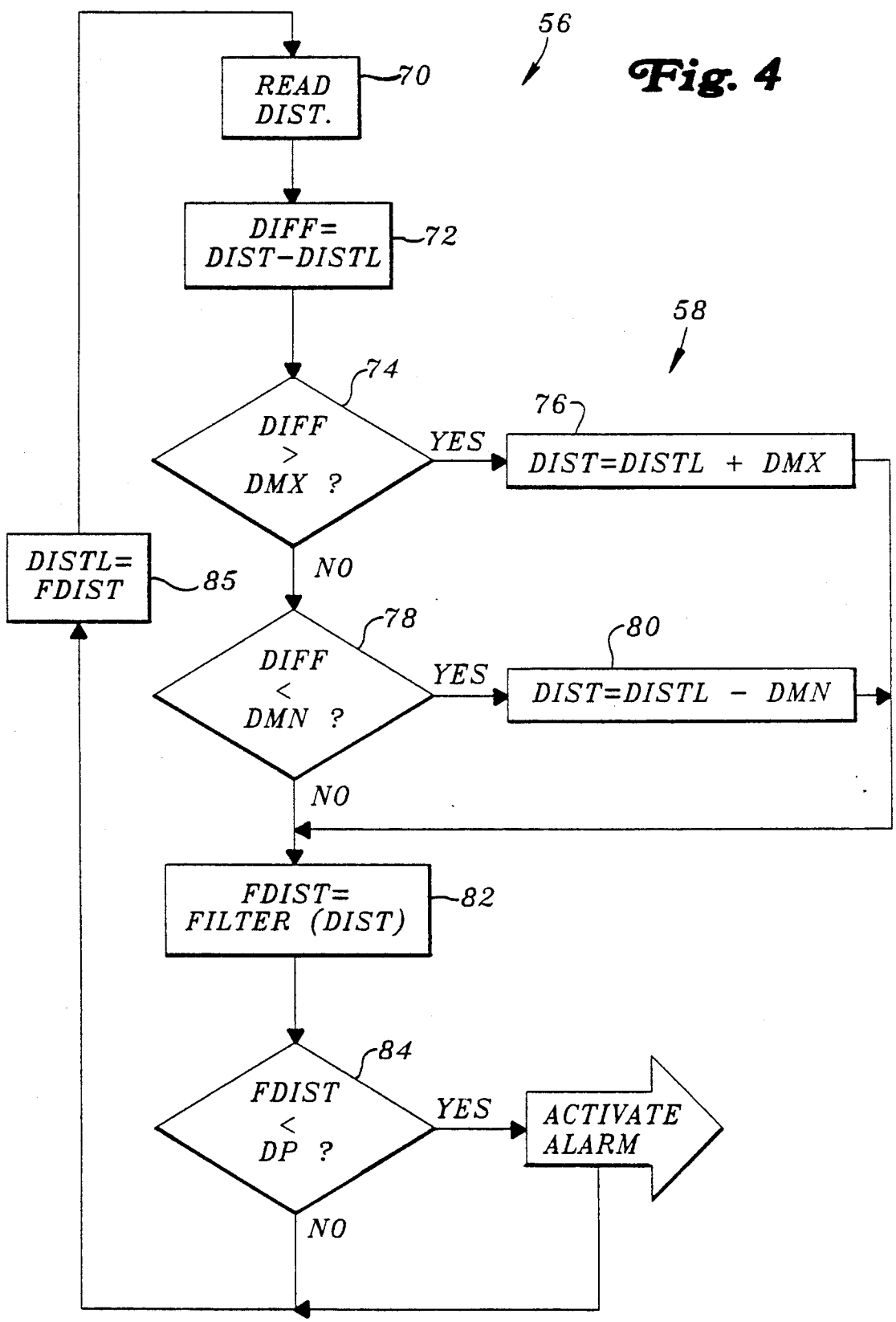
FIG. 4 is a flow chart showing the algorithm utilized with the circuitry of FIG. 3.

The processing circuitry 56 includes a conventional microprocessor circuit operating according to the algorithm as set forth in FIG. 4 and the Fortran program listing directly below.

```
C    CONTCOT2. FOR - COTTON PLUGGING DETECTION ALGORITHM
C    USE WITH INITLPC1.FOR
C       CON (1) = DISTANCE TO BOTTOM OF DUCT (INCH) (36)
C       CON (2) = DISTANCE CHANGE FOR PLUG TO OCCUR (INCH) (6)
C       CON (3) = "a" CONSTANT IN DIGITAL FILTER EQUATION
C       CON (4) = 0 = >NO BELL, >0 = >BELL
C       CON (5) = INCREASE IN DIST ALLOWED PER SAMPLE (>0)
C       CON (6) = DECREASE IN DIST ALLOWED PER SAMPLE (<0)
C       CON (7) = CHANNEL # TO BE USED FOR DIST
C    SELECT CHANNEL:
     IDCH = CON(7)+.5
     DIST = A(IDCH)
C    SLEW RATE LIMIT:
     DIFF = DIST - AA(3)
     IF (DIFF.GT.CON(5)) THEN
            DIST = AA(3) + CON(5)
```

```
        ELSEIF (DIFF.LT.CON(6)) THEN
                DIST = AA(3) + CON(6)
        ENDIF

C   FIRST ORDER LOWPASS DIGITAL FILTER:
C            y = ym1 + a* (x + xm1 - 2*ym1)
C   WHERE a = c/(c+1)
C                       c = tan (T/(2*tau))
        FDIST = AA(2) + CON(3)*(DIST + AA(3) - (AA(2) + AA(2))
        AA(2) = FDIST
        AA(3) = DIST
        IF (ABS (FDIST - CON(1)).GT.CON(2)) THEN
                IVOUT(1) = 2047
                IF (AA(1).GE.5) THEN
                        AA(1) = 0
                        IF (CON(4).EQ.0.) THEN
                                BEL = 0
                        ELSE
                                BEL = 7
                        ENDIF
                        WRITE (0,5) FDIST, BEL
5               ELSE    FORMAT (2X, 'PLUGGED',3X, F4.0, A1)

ENDIF   AA(1) = AA(1) + 1.
        ELSE
                IVOUT(1) = 0
                IF (AA(1).GE.5.) THEN
                        AA(1) = 0.
                        WRITE (0,6) FDIST
6                       FORMAT (2X, 'CLEAR', 3X, F4.0)
                ELSE
                        AA(1) = AA(1) + 1.
                ENDIF

ENDIF

RETURN
        END
```

In operation, the sensor 46 directs an ultrasonic beam 48 toward the offset area 36a and samples the reflected signal 49 at regular intervals. The distance (DIST) is read at 70 and compared with the previous distance calculation (DISTL) at 72. If the computed difference (DIFF) between the current reading and the last calculated distance reading, at 74, is greater than a preselected distance increase per sample (DMX), the new calculated distance (DIST) is increased by the maximum allowed increment (i.e., to DISTL + DMX) at 76. On the other hand, if the difference indicates the reading is decreasing at a rate per sample such that DIST - DISTL is less than a preselected minimum value DMN at 78, the new calculated distance is set to (DISTL - DMN) at 80. If the change in the distance reading (DIFF=DIST - DISTL) is within the preselected limits, the distance value at 82 remains equal to DIST, the actual distance determination for the sample. The algorithm at 82 provides first order lowpass digital filtering of the distance signals to reduce sensitivity to spurious reflections caused by such things as twigs and other plant debris which only temporarily and intermittently pass through the beam 48, or by short, temporary blockages that quickly clear themselves.

The filtered distance signal FDIST is compared with the preset plug value ($D_P$) at 84, and if the distance is less than $D_P$, the alarm 60 is activated to alert the operator to a plugged condition. If FDIST is greater than $D_P$ (indicating a blocked condition has not yet been reached), DISTL is set to the new calculated distance at 85, and the reflected signal is again sampled as the loop is begun again at 70. Preferably, the loop cycles at about a 10 Hz rate.

Figure 5:
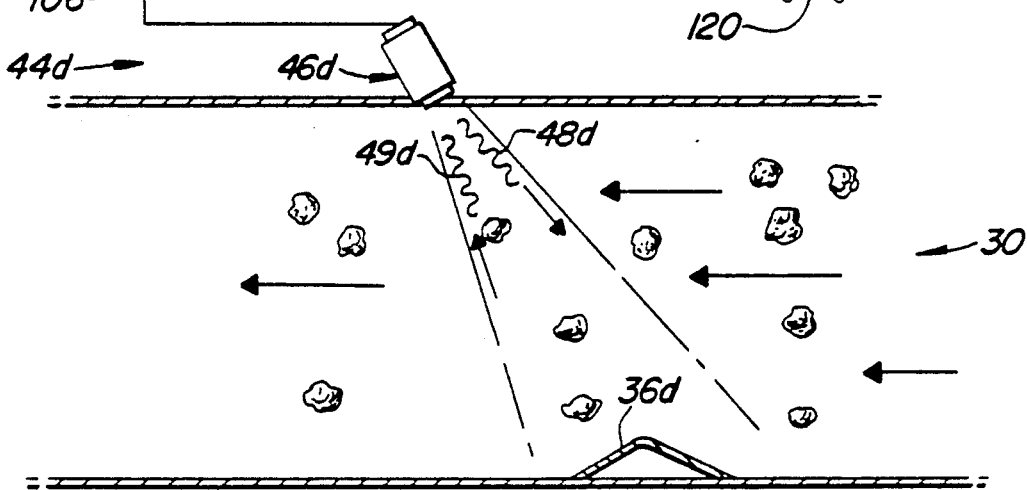
FIG. 5 is a schematic diagram illustrating an alternate embodiment of the invention wherein a doppler detection circuit is utilized to detect the presence of moving cotton in the path.

In an alternate embodiment shown in FIG. 5, the blockage detection system 44d includes conventional doppler effect circuitry 106 (FIG. 5) for detecting a frequency shift in the reflected signal 49d as the result of the signal 48d being reflected from a moving object in the cotton conveying path 30. The circuit 106 also includes standard distance determining circuitry for detecting the presence of cotton in the area of the beam 48d. The output of the circuit 106 is connected to a logic circuit 108. The logic circuit 108 is connected to a readout/alarm circuit located in the harvester cab and is responsive to cotton presence and cotton moving signals provided by the circuit 106.

The sensor 46a is angled so the beam 48a is directed into the path of the cotton and includes a component in the direction of the flow of cotton in the path 30 so that a doppler shift will occur when the signal is reflected from an object moving in the path. A small, flat acoustic reflector 36d is mounted at the bottom of the path 30, perpendicular to the beam 48d, to provide a strong reflection for establishing a reference signal indicative of distance between the sensor and the bottom of the path in the absence of a blockage in the area of the beam.

In one embodiment of the invention as shown in FIG. 5, an indication is provided at an output 116 of the circuitry 106 when cotton is detected in the beam 48d between the reflector 36d and the sensor 46d. If at the same time a doppler shift in frequency is detected, an indication is provided at the output 118, and the logic circuit 108 activates the indicator 60d to provide a signal to the operator that cotton is moving in the path. If cotton presence and no doppler shift are detected, the logic circuit 108 causes the indicator to provide "plug downstream" warning. If the output at 116 of FIG. 5 indicates that there is no cotton present in the path, then either the unit is plugged upstream of the detector 46d or the row unit is not picking cotton. A "plug upstream" warning signal is given with a no cotton present indication at 116 if the row unit is in the normal field-operating mode as determined by a row unit interlock switch 120 operably connected to the row unit drive control. If a buildup of material is present at the area 36d, indicated by an absence of the reflected reference signal from the reflector 36d for a period of time and a reduced distance sensed indication less than a minimum $D_{P2}$ which results when material builds up to a plugged condition adjacent the offset portion 36d, an alarm is provided at 60d.

In yet another aspect of the present invention, the doppler effect circuitry can be used not only to detect moving cotton but also to detect whether cotton is moving both toward and away from the sensor 46d. Two sensors 46d may be used, one angled toward the right as shown in FIG. 5 and another angled toward the left. As cotton moves from the forward doffer 22 toward the sensor 46d, the doppler shift will be in a first direction. Signals reflected from cotton moving away from the sensor 46d will provide a doppler shift in the opposite direction. By checking for the presence of doppler shifts in both directions, an indication can be provided that the cotton path is open both upstream and downstream of the sensor. In the absence of one of the doppler shifts, an indication can be provided of a possible blockage condition in the given direction. This signal may be utilized to provide advanced warning to the operator that a blockage condition is developing before cotton actually builds up to a plugged condition adjacent the sensor 46d. Also, an indication can be provided to the operator more precise as to the location of a blockage when one does occur. By checking both doppler shift and distance signals from the signal processing circuitry 56, more selective indications and alarms can be provided depending upon the combination of conditions detected.

Having described the preferred embodiment, it will become apparent that various modifications can be made without departing from the scope of the invention as defined in the accompanying claims.

We claim:

1. In a cotton harvester having a row unit with a row-receiving area and a cotton conveying system for removing cotton from the row unit, the cotton conveying system including a path defined in part by path boundary structure, the path having an opened condition wherein cotton freely moves and a blocked condition, an offset area located adjacent the path boundary structure and offset from the cotton path, the offset area being generally free of cotton when the system is in the opened condition but receiving cotton when the cotton path becomes blocked, and detector means including means for radiating a signal towards the offset area and means responsive to reflective of the radiated signal from cotton in the offset area for providing a blockage indication.

2. The invention as set forth in claim 1 wherein the detector means includes distance sensing means for providing distance signals.

3. In a cotton harvester having a row unit with a row-receiving area and a cotton conveying system for removing cotton from the row unit, the cotton conveying system including a path defined in part by path boundary structure, the path having an opened condition wherein cotton freely moves and a blocked condition, an offset area located adjacent the path boundary structure and offset from the cotton path, the offset area being generally free of cotton when the system is in the opened condition but receiving cotton when the cotton path becomes blocked, detector means responsive to cotton in the offset area for providing a blockage indication, wherein the detector means includes distance sensing means for providing distance signals, and including means supporting the detector means for providing a first distance signal, when the path is open, indicative of the distance between the sensing means and the offset area, and for providing a blockage signal, when the path is blocked and cotton is present in the offset portion, indicative of the distance between the cotton in the offset portion and the distance sensing means, and further including means for providing a stream of moving air adjacent the offset portion.

4. The invention as set forth in claim 2 wherein the distance sensing means includes an ultrasonic detector located out of the cotton path.

5. In a cotton harvester having a row unit with a row-receiving area and a cotton conveying system for removing cotton from the row unit, the cotton conveying system including a path defined in part by path boundary structure, the path having an opened condition wherein cotton freely moves and a blocked condition, an offset area located adjacent the path boundary structure and offset from the cotton path, the offset area being generally free of cotton when the system is in the opened condition but receiving cotton when the cotton path becomes blocked, distance sensing means including a detector responsive to cotton in the offset area for providing a blockage indication, and filter means for preventing a blockage indication when cotton is present in the offset area only intermittently.

6. In a cotton harvester having a row unit with a row-receiving area and a cotton conveying system for removing cotton from the row unit, the cotton conveying system including a path defined in part by path boundary structure, the path having an opened condition wherein cotton freely moves and a blocked condition, an offset area located adjacent the path boundary structure and offset from the cotton path, the offset area being generally free of cotton when the system is in the opened condition but receiving cotton when the cotton path becomes blocked, and detector means responsive to cotton in the offset area for providing a blockage indication, wherein the detector means includes distance sensing means for providing distance signals, wherein the distance sensing means includes an ultrasonic detector located out of the cotton path, and a doppler circuit for providing a moving cotton indication.

7. The invention as set forth in claim 6 including means for providing separate indications for a blockage upstream of the detector means and downstream of the detector means.

8. The invention as set forth in claim 7 wherein the means responsive to the second signal includes means for providing a blockage indication when the cotton in the offset portion is built up to a distance in the range of three to twelve inches in depth.

9. The invention as set forth in claim 7 wherein the means responsive to the second signal includes means for preventing spurious blockage indications when cotton is present only for a relatively short period of time in the offset portion.

10. The invention as set forth in claim 7 including a doppler effect detector for providing a doppler indication of cotton moving in the path, and means responsive to the doppler indication for providing a blockage signal dependent upon whether or not cotton is moving in the path.

11. A blockage detection system for a cotton harvester which includes a cotton conveying path, the detection system comprising:
a sensor including a transmitter for establishing a signal in the path and a receiver for receiving signal echoes from the path;
a doppler circuit responsive to a doppler shift in frequency of the signal echoes reflected from moving cotton for detecting moving cotton in the path and providing a path condition signal; and
alarm means connected to the doppler circuit and responsive to the path condition signal for providing a blockage indication.

12. The invention as set forth in claim 11 further including a distance detecting circuit connected to the receiver for providing distance signals indicative of the distance between the sensor and objects in the path, said detecting circuit providing a first signal indicative of the distance to a fixed location in the path when no cotton is present adjacent that location, and wherein the alarm means is also responsive to the first distance signal 13. The invention as set forth in claim 12 wherein the distance detecting circuit also provides second signals indicative of the distance to objects in the path, and wherein the alarm means is responsive to accumulation in the path of a preselected amount or more of material adjacent the fixed location for providing a blockage indication.

14. The invention a set forth in claim 11 further including switch means responsive to the operation of the harvester to pick cotton for providing an indication that the harvester is picking cotton, wherein the alarm means is responsive to the picking indication for providing the blockage indication when moving cotton is not detected in the path and the harvester is operating to pick cotton.

15. In a cotton harvester having a row unit with a row-receiving area and a cotton conveying path having opened and blocked conditions, the path defined in part by path boundary structure, wherein a portion of the path boundary structure is offset from the cotton path when the path is in the opened condition but receives cotton when the cotton path becomes blocked, a blockage detection method comprising the steps of:
supporting a distance detecting instrument from the row unit and radiating a signal from the instrument toward the offset portion of the path boundary structure for providing a distance signal indicative of the distance between the instrument and an object in the path of the radiated signal; and
providing an alarm signal when the distance signal indicates a preselected build-up of cotton in the offset portion.

16. In a cotton harvester which includes a cotton conveying path, a blockage detection method comprising the steps of:
radiating a signal into the path;
receiving signal echoes from the path;
providing a doppler circuit responsive to the signal echoes for determining whether or not cotton is moving in the path, including the step of determining whether a doppler shift in frequency resulting from movement of cotton in the path is present; and
providing a blockage indication in response to a determination that cotton is not moving in the path.

17. The invention as set forth in claim 16 further including the steps of:
providing a material presence determining circuit responsive to the signal echoes for detecting the presence or absence of cotton within the path; and
providing the blockage indication upon the condition that cotton is detected in the path and cotton is not moving in the path.

18. The invention as set forth in claim 17 further including the steps of:
utilizing the material presence determining circuit to detect the build-up of cotton or cotton debris in an area of the cotton path; and
providing a blockage indication when a preselected amount of build-up is detected.

19. The method as set forth in claim 16 further including the steps of:
utilizing the doppler circuit to determine direction of cotton movement relative to the source of radiated signals, and selectively providing upstream and downstream blockage indications dependent upon the direction determinations.

20. A method of detecting a blockage in the cotton conveying path of a cotton harvester comprising the steps of:
a) radiating a signal into the cotton conveying path from a signal source;
b) receiving signals reflected from cotton in the path;
c) providing a doppler circuit and determining the presence or absence of a doppler shift in frequency indicating moving cotton in the path;
d) providing a harvester operation indication when the harvester is operating to pick cotton; and
e) providing an operator warning device responsive to the doppler shift determination and the harvester operation indication; and
f) activating the warning device when the doppler shift determination is absent and a harvester operation indication is present.

21. The method as set forth in claim 20 further including the steps of:
g) utilizing the doppler circuit to determine the direction of movement of cotton relative to the signal source; and
h) providing blockage location signals dependent upon the direction of cotton movement determination in step g).

22. The invention as set forth in claim 20 wherein step a) includes radiating an acoustic signal in a preselected direction toward an acoustic reflector positioned substantially perpendicular to the preselected direction, and further including the step of providing a reference distance signal indicative of the distance between the signal source and the reflector.

23. The invention as set forth in claim 22 further including the steps of detecting a build up of material between the signal source and the reflector, and providing a blockage indication when a preselected build up of material is detected.

24. In a cotton harvester having a row unit with a row-receiving area and a cotton conveying path having opened and blocked conditions, the path defined in part by path boundary structure, wherein a portion of the path boundary structure is offset from the cotton path when the path is in the opened condition but receives cotton when the cotton path becomes blocked, blockage detection structure comprising:

distance sensing means for providing distance signals;
  means supporting the sensing means from the row unit for providing a first distance signal, when the path is open, indicative of the distance between the sensing means and the offset portion of the path boundary structure and for providing a second distance signal, when the path is blocked and cotton is present in the offset portion, indicative of the distance between the cotton and the sensor; and
  means responsive to the second signal for providing a blockage indication.

* * * * *